N. E. FUNK & L. P. WHITAKER.
FLAX PULLING AND HARVESTING MACHINE.
APPLICATION FILED APR. 3, 1914.
1,145,010.
Patented July 6, 1915.
7 SHEETS—SHEET 5.
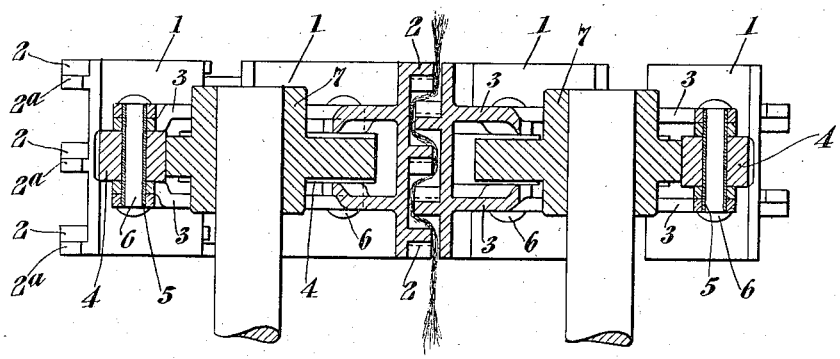
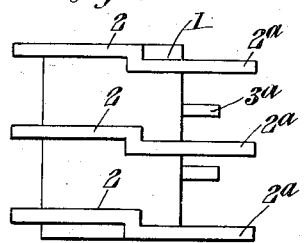
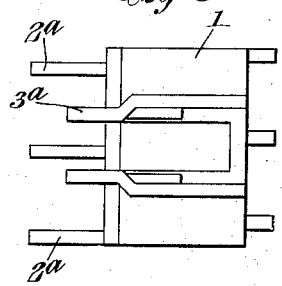
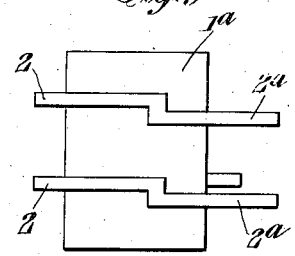
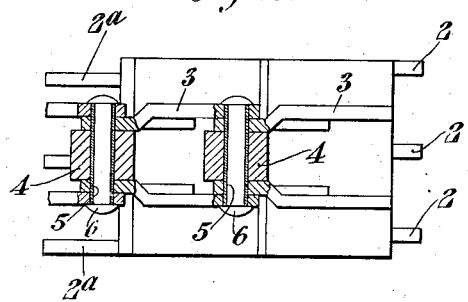
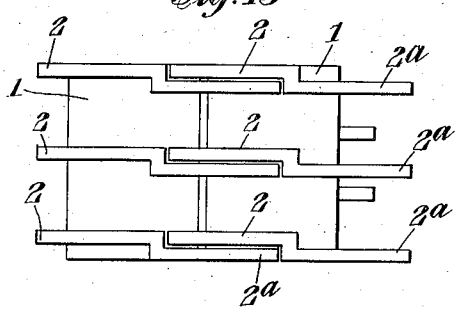

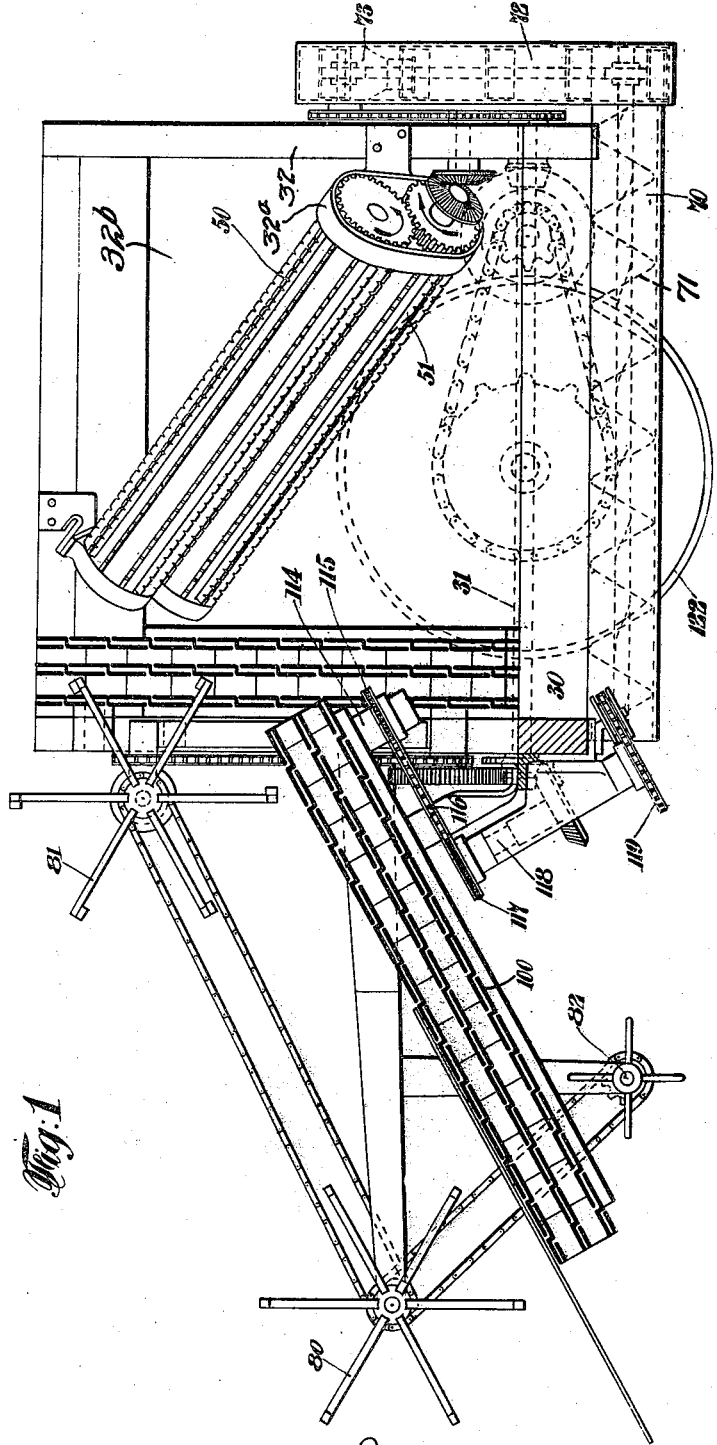

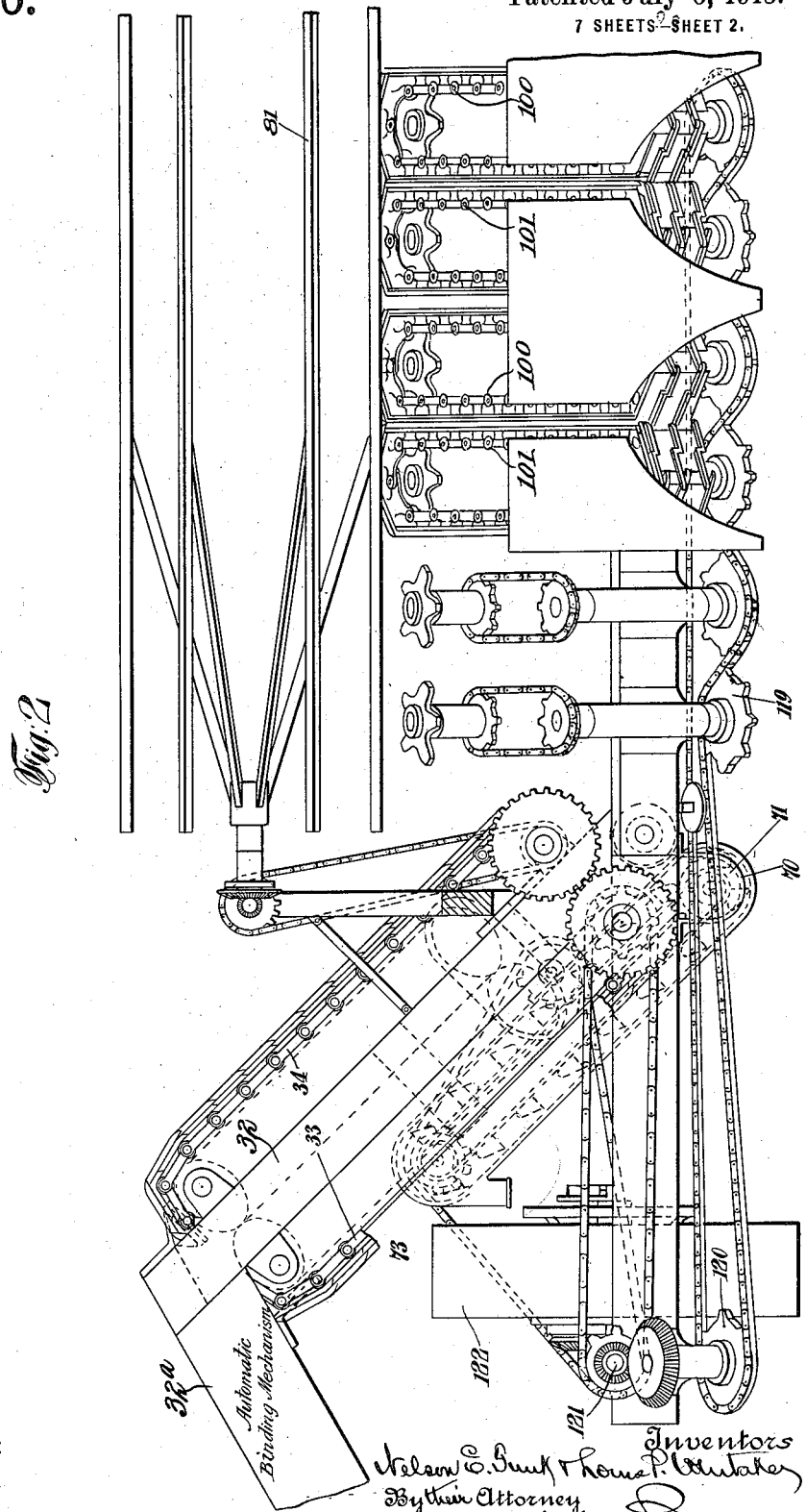

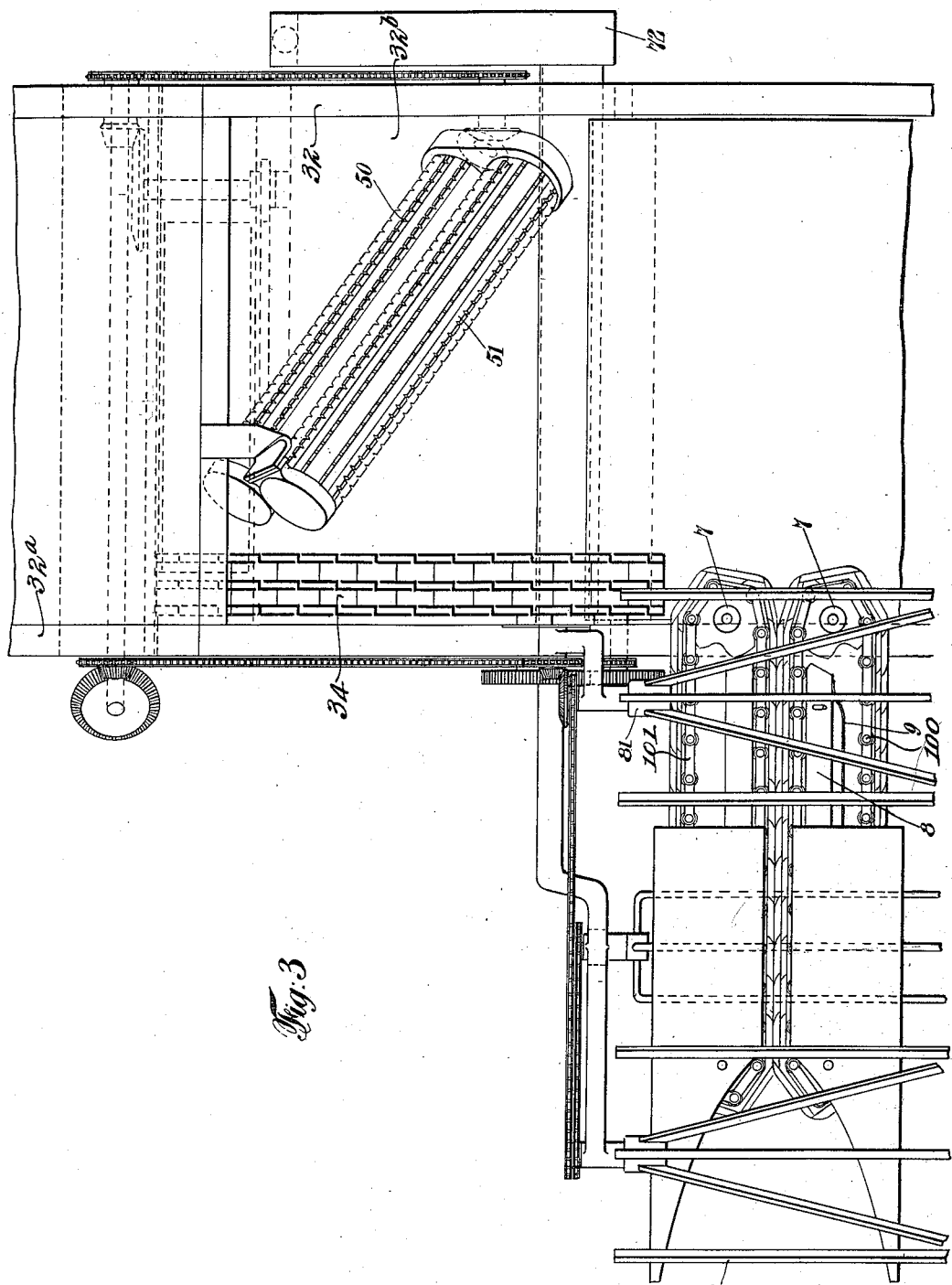

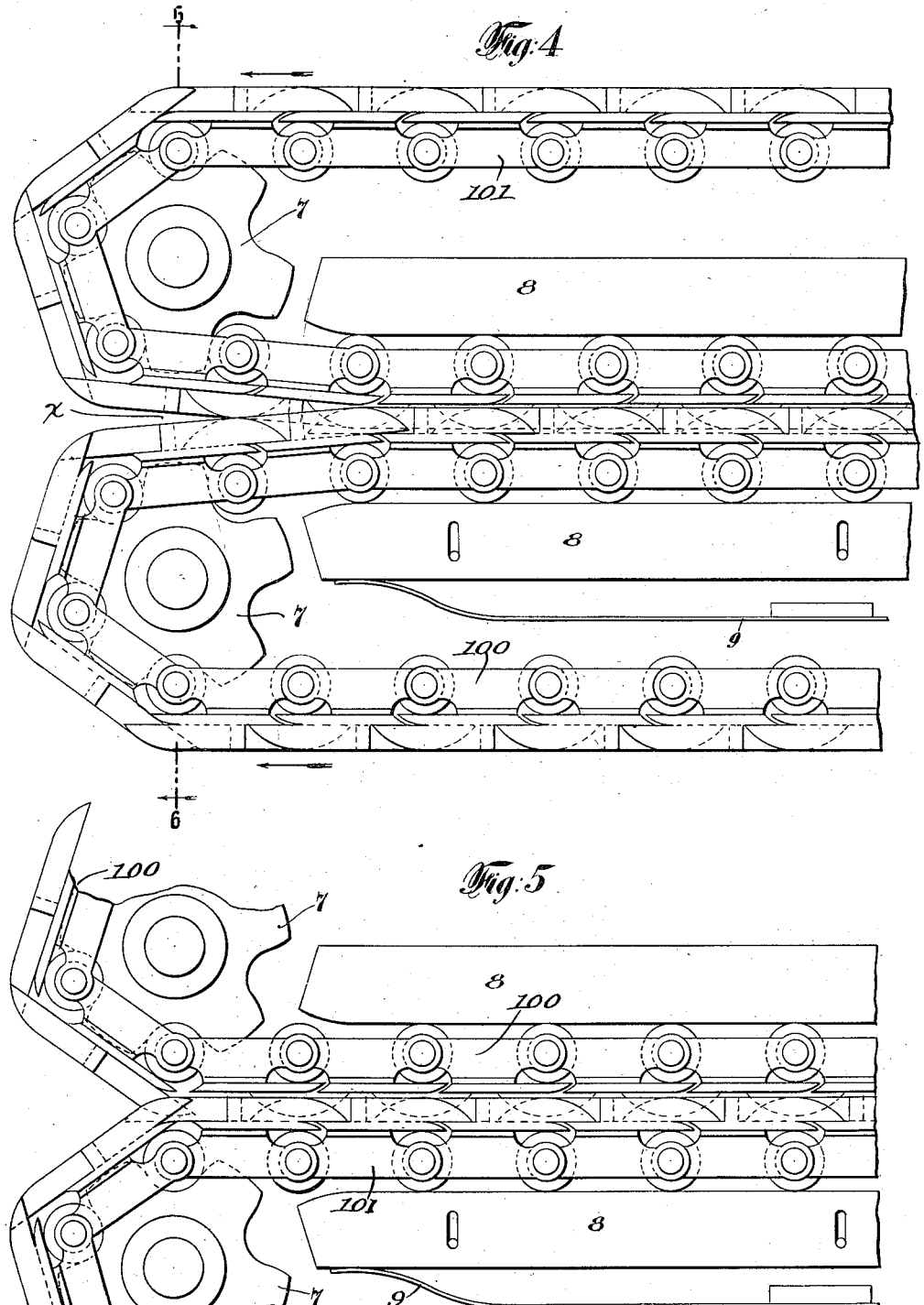

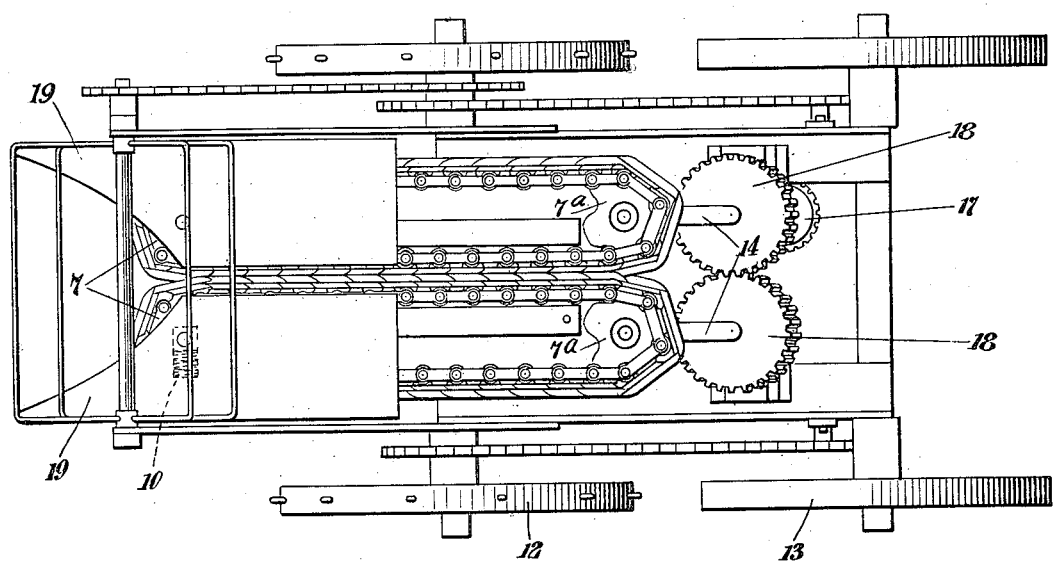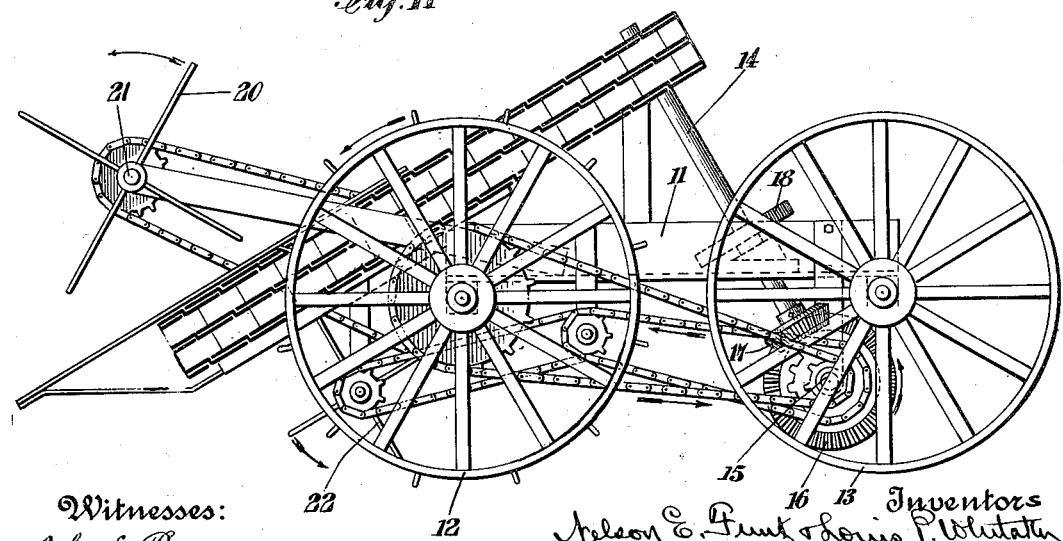

N. E. FUNK & L. P. WHITAKER.
FLAX PULLING AND HARVESTING MACHINE.
APPLICATION FILED APR. 3, 1914.
1,145,010.
Patented July 6, 1915.
7 SHEETS—SHEET 7.
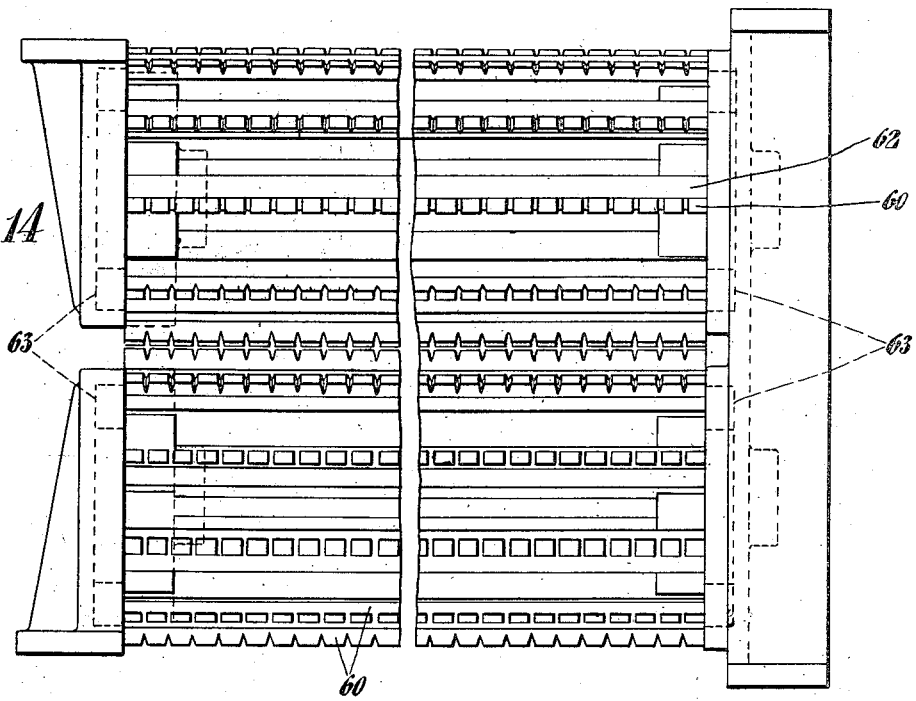
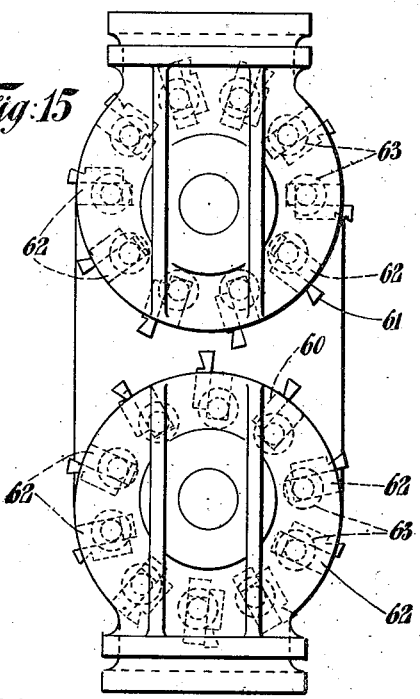
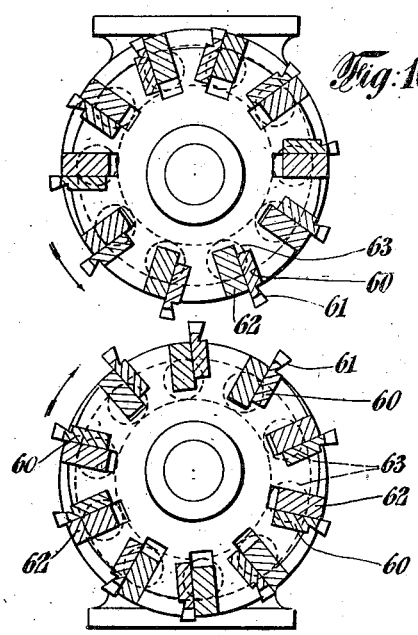
Witnesses:
John E. Prager
A. Worden Gibbs
Inventors
Nelson E. Funk
Lionel P. Whitaker
By their Attorneys

UNITED STATES PATENT OFFICE.

NELSON E. FUNK, OF MONTCLAIR, NEW JERSEY, AND LOUIS P. WHITAKER, OF NEW YORK, N. Y.; SAID FUNK ASSIGNOR TO VICTOR E. FREEMAN, OF NEW YORK, N. Y.

FLAX PULLING AND HARVESTING MACHINE.

1,145,010.  Specification of Letters Patent.  Patented July 6, 1915.

Application filed April 3, 1914. Serial No. 829,213.

*To all whom it may concern:*

Be it known that we, NELSON E. FUNK, a citizen of the United States, residing at Montclair, in the county of Essex and State of New Jersey, and LOUIS P. WHITAKER, a citizen of the United States, residing at New York, in the county and State of New York, have invented new and useful Improvements in Flax Pulling and Harvesting Machines; and we do hereby declare the following to be a full, clear, and exact description of the invention, such as will enable others skilled in the art to which it appertains to make and use the same.

Our invention consists in the novel features hereinafter described, reference being had to the accompanying drawing in which we have shown one embodiment of our invention, selected by us for purposes of illustration, and the said invention is fully disclosed in the following description and claims.

Referring to the said drawings:—Figure 1 represents a longitudinal sectional view taken through a flax harvesting machine embodying our invention, between the opposing pulling chains of one of the pulling units, and showing in elevation a mechanism for removing the seed pods and cups from the plants. Fig. 2 is a front view of a portion of the apparatus showing several pulling units and the seed removing mechanism before mentioned. Fig. 3 is a partial plan view of the machine. Fig. 4 is an enlarged plan view of a portion of one of the pulling units showing the pulling chains in their open positions at the forward ends thereof. Fig. 5 is a similar detailed view showing the chains in closed position at their front ends. Fig. 6 is a sectional view on line 6—6 of Fig. 4. Fig. 7 is a front view of one of the links for one of said chains. Fig. 8 is a rear view of the same. Fig. 9 is a front view of one of the links of the opposing chains. Fig. 10 is a plan view of a small apparatus for pulling flax only and containing a single pulling unit. Fig. 11 is a side elevation of the small apparatus shown in Fig. 10. Fig. 12 is a rear view of adjacent connected clamping plates, parts being shown in section. Fig. 13 is a front view of the same. Fig. 14 is a front elevation of the mechanism for combing the stalks to remove the seed and seed pods and the buttons on the ends of the branches, and preparing the stalks for further treatment to obtain the fiber therefrom. Fig. 15 is an end elevation of the same. Fig. 16 is a vertical transverse sectional view through the combing cylinders.

Growing flax is ordinarily harvested in one of two ways according to the use to which the product is to be put. If it is harvested for the purpose of obtaining the seed for the production of linseed oil, it is ordinarily cut and thereafter threshed for the removal of the seed in a manner not unlike the handling of other grain. When, however, the flax is desired in order that its fiber may be extracted for the manufacture of linen, it is found that satisfactory commercial results are not obtained if the flax is cut off, and that such satisfactory results can only be obtained when the plants are pulled root and all from the ground. This is a recognized fact in handling flax, and it is also observed that the removal of the roots from the ground enables the farmer to obtain better results from successive crops. The pulling of flax is ordinarily accomplished by hand and is very expensive on account of the labor involved. It will be apparent that, in case flax is harvested for the purpose of producing linseed oil, the straw is a loss and yields no return to the farmer, and, on the other hand, where the flax is pulled for the purpose of utilizing the fiber, it is practically impossible to obtain the seed commercially, as the plants are pulled in a more or less immature state and the seed is lost.

The object of the present invention is to provide mechanical means for enabling the flax to be pulled from the ground with the roots without the use of hand labor, and our invention also contemplates the embodiment of the flax pulling apparatus hereinafter described in a machine equipped with the usual self-binding mechanism in use in connection with other grains, and provided further with mechanism by means of which the stalks after being pulled are relieved of their seed pods, the seed and pods and any adhering particles of the stalk branches being separately preserved so that they may be dried and threshed or winnowed, or otherwise treated for the separation of the seed which may, therefore, be utilized in the production of linseed oil and other linseed products. It is found that the base of the seed cup or pod, which comprises a tiny button, adheres very strongly to the end of the branch of the plant on which it grows and is apparently intimately connected with the ends of the fibers terminating at such button, and the presence of these cups or buttons persists in the after treatment of the fiber so that it is very advantageous to eliminate them as far as possible in separating the seed pods from the plants and the special mechanism hereinafter described is especially designed to separate substantially all of the buttons, or seed pod bases, as well as the pods and seeds from the plants, so that the stalks with roots attached may be bound up in bundles or otherwise delivered from the machine ready for treatment for the production of linen.

We will first describe the flax pulling mechanism specifically.

In Figs. 10 and 11 we have illustrated an embodiment of our invention comprising a single pulling unit, and as these units are identical in machines having a plurality of such units, a description of the unit will make clear the entire operation of the pulling mechanism. We have discovered a new and unique mechanism for holding the stalks of the grain against longitudinal movement, which comprises opposing parts provided with separate ribs, or flanges, extending substantially transversely of the grain or flax, the ribs of one of said opposing parts alternating with those of the other and being constructed and arranged in connection therewith so that when the grain is gripped between the opposing parts it is deflected back and forth in a serpentine manner between the alternating ribs. By this means the flax or other similar material can be gripped so as to prevent its being pulled out longitudinally without the necessity for any particular pressure being exerted on the plant by the alternating ribs, and it is also found that the device indicated will hold the plants firmly whether there is a single stalk or a large number of stalks so bent and deflected by the opposing and alternating ribs. The relation between the projections on the opposing plates we designate as "intermeshing" as it is somewhat similar to the relation a tooth of a gear wheel bears to the teeth of an engaged rack or gear wheel between which it enters, and this relation is not to be confused with the ordinary clamping of stalks between flat surfaces either smooth or roughened as the operation of such devices is quite different, there being no clamping in the ordinary sense, but a holding of the stalks against longitudinal movement by the bends imparted to them by the intermeshing projections. In embodying this basic idea in an apparatus for continuously pulling flax we provide a plurality of plates pivotally connected so as to form an endless arrangement of such plates, said plates being provided with the ribs before referred to and being caused to travel around suitable rollers, the ribs acting in conjunction with opposing ribs alternating therewith on another series of plates similarly arranged and driven, the stalks being gripped between said plates and carried thereby from one end of the unit to the other and the said pair of endless chains of plates so formed are given a suitable inclination from the horizontal from front to rear so that the stalks are gradually elevated as they are carried to the rear, and in practice the opposing chains are operated toward the rear at substantially the same speed as the machine moves forwardly, the effect of which is to simply pull the stalks out of the ground as the machine progresses. Various forms of chain plates or links may be used but we have found one desirable and satisfactory construction to be that shown in Figs. 6 to 9 inclusive, in which the plates of one chain are provided with three ribs while the plates of the opposing chain are provided with two ribs arranged to alternate with the three ribs of the opposing plate. To facilitate the supporting and driving of the chains of plates, we prefer to either connect the plates to the links of a suitable driving chain, or to cast the plates and links integrally as shown in the drawings referred to. Fig. 7, for example, shows the front face of a chain plate 1 provided with three ribs 2 and, in order to insure the continuity of the ribs throughout the chain of plates, we find it convenient to make these ribs half the width desired for the operative ribs and to form the ribs on each of said plates in two sections as shown at 2 and 2$^a$ out of alinement with each other, the said rib portions, 2 and 2$^a$, projecting from the transverse edges of the plates in such a manner that when the plates are longitudinally alined the portions 2$^a$ of one plate will occupy positions along side of the parts 2 of the adjacent plate and vice versa, as shown, for example, in Fig. 13, the effect of which is to produce ribs extending longitudinally of the chain of plates when the plates are in a straight line. It will also be understood that the opposing plates 1$^a$, or those of the adjacent chain are provided with similar rib portions 2 and 2$^a$ in a similar manner, the only difference being that they are so located that the ribs of one plate alternate with those of the opposing plate at all times when they are in opposition. In this instance we have shown the back of each of said plates provided with link portions 3 having portions 3$^a$ at one end in closer proximity to each other and adapted to receive between them a friction roller 4, said link portions 3 and 3$^a$ being provided with suitable apertures to receive the pivotal connections connecting said link portions with the link portions of the adjacent plates. We prefer to pass a hollow cylindrical sleeve 5 through the apertures in the links and the central aperture of the roll 4 which sleeve forms the bearing for the roll and the pivot for the links, and this sleeve is held in position by a rivet 6 which passes therethrough and is provided with a head at each end as indicated in Fig. 6. The pulling unit comprises two chains, the one formed of links 1 and the other formed of links 1ª, said chains being mounted at each end of the unit on a sprocket wheel 7, see Figs. 10 and 11, and 4 and 5. The adjacent laps of the two plate chains are held in proper interlocking engagement by suitable guides 8, 8, extending longitudinally of the unit and in order to allow for the slight separation of the opposed plates in case an obstacle or a bunch of material should get between them, and to hold them yieldingly in proper relation with each other, one or both of the guides 8 is provided with a spring. In Figs. 4 and 5 for example, we have shown one of said guides laterally movable and provided with a leaf spring 9, the other being rigidly supported in any suitable manner. It is also preferred that the sprocket wheel 7 on the side adjacent to the yielding guide 8 should also be mounted in movable bearings against suitable retracting springs in order that it may yield laterally slightly if occasion may require. Thus in Fig. 10 we have indicated in dotted lines one of the bearings for the movable sprocket wheel, arranged to slide laterally and provided with a retracting spring 10. It is desirable to have the links as long as possible longitudinally of the chain and at the same time to have the sprocket wheels as small as possible, and we prefer to provide the sprocket wheels as shown in Figs. 4 and 5 with five teeth each, and of very small diameter. With this type of sprocket it will be seen that as the rolls of the chains pass around the front of the sprockets they will present the links successively in a position inclined to the opposing links of the other chain as clearly shown in Fig. 4. Thus the space between the ribs is much greater at the point indicated by $x$ in Fig. 4 when a tooth of each of the sprocket 7 is opposite a tooth of the other sprocket, than it is between the inner ends of the same plate. This affords a very considerable opening which facilitates the entrance of the standing grain between the opposing plates and upon a further revolution of the sprocket 7 half of the distance between two teeth, as indicated in Fig. 5, the opposing plates are pressed closely together and their friction rolls immediately pass on to the guides 8 so that such plates are never permitted to separate again until they have reached the rear or upper end of the unit, and during all this time the flax or other material is firmly clamped between the opposing plates and forced into the serpentine relation, previously described, by the opposed alternating ribs of the chain plates.

The apparatus shown in Figs. 10 and 11 comprises what might be termed the simplest form, or embodiment, of our invention and consists of a main supporting frame 11 mounted on suitable wheels 12 and 13, the said frame being provided with means for supporting the front sprockets 7 which are idle, and also being provided with driving shafts 14 carrying the rear sprockets indicated at 7ª which impart motion to the chains of plates. The front wheels 12, in this instance, are the traction wheels and are connected by means of sprocket gearing with a transverse shaft 15 carrying a beveled driving wheel 16 meshing with a beveled pinion 17 on one of the driving shafts 14, the two driving shafts being connected for rotation by intermeshing gears 18. The pulling chains are thus maintained in an inclined position as shown and the front end of the mechanism is provided with suitable guards 19 for deflecting the stalks inward to the grip or bite of the opposed plates. We may provide an over-head reel indicated at 20 supported on a suitable shaft 21 and operated by sprocket or other gearing from the driving mechanism of the machine as indicated in Figs. 10 and 11 to assist in presenting the flax to the pulling mechanism. We also prefer to provide mechanism for knocking off dirt adhering to the roots, and, in this instance we have shown a beater 22 supported below the forward portion of the pulling chains and connected by sprocket or other gearing with the driving mechanism of the machine for striking the roots as they depend from the chain plates and removing the dirt therefrom.

From a consideration of Figs. 10 and 11 it will be seen that as the machine is propelled forward the traction wheels will drive the chains so that the opposed portions thereof will move rearward, and, preferably, at the same speed as the forward progress of the machine. The stalks will be gripped between the opposing plates in the manner hereinbefore described and the effect upon them of the upward travel of the chains is to pull the stalks vertically out of the ground while the beater 22 knocks off the dirt and the stalks are carried upward and discharged at the rear ends of the pulling chains. The machine illustrated in Figs. 10 and 11 will obviously only pull a narrow swath but it is only necessary to provide a machine with a plurality of these pulling units arranged side by side to pull in a desired width or swath simultaneously, and in the type of machine illustrated in Figs. 1, 2 and 3 we contemplate the provision of five at least of these units, although the number is not material. It will be obvious that the flax may be pulled by the machine shown in Figs. 10 and 11 and discharged rearwardly on the ground and afterward removed in any desired manner for treatment, and it will also be apparent instead of dragging the machine over the ground it may be propelled by a tractor or a suitable engine mounted on the frame of the machine and operatively connected with the pulling mechanism or with the traction wheels or both.

In the embodiment of our invention illustrated in Figs. 1, 2 and 3 we have shown a machine which is provided with a plurality of pulling units, the opposing chains of which are indicated at 100 and 101 respectively, supported in front of a horizontally disposed receiving grain platform 30 over which passes a horizontal apron 31. In this instance the shafts 114 which carry the upper sprocket wheels for the pulling units are provided with sprocket wheels 115 connected by sprocket chains 116 with sprockets 117 on inclined shafts 118 provided with sprocket wheels 119 at their lower ends and said sprocket wheels 119 are driven by a continuous chain passing around the successive wheels 119 in opposite directions as shown in Fig. 2, thus imparting motion from a driving sprocket 120 which is geared with the driving shaft 121 of the machine. The frame work of the machine is supported upon a suitable bull wheel 122 which may be operatively connected with the driving shaft 121 by means of beveled gearing as indicated in Fig. 2, or the driving shaft 121 may be driven by a motor supported on a machine or by a connection with the motor of a tractor employed to draw the machine over the ground as may be found most desirable. In Fig. 2 the plate chains of one unit have been removed in order to show the gearing therefor.

The framework of the machine is provided with an upwardly extending portion 32 and an outwardly extending portion 32$^a$ passing over the bull wheel in the usual manner and upon the portion 32$^a$ of the framework is supported the binding and tying mechanism which is of the same character as that in general use on the self-binding harvesters and is, therefore, not herein specifically shown or described. It will be understood that the flax as it is pulled by the various units of a pulling mechanism is carried upward and discharged horizontally on the endless apron 31, which carries it toward the inclined portion 32 of the machine and a suitable mechanism is provided for carrying it up said inclined portion and delivering it to the binding mechanism. If the seed pods are not to be removed such mechanism would consists simply of the ordinary elevating aprons such as are used in self-binding harvesters, but we prefer to remove the seed before the flax is bound and to this end we prefer to provide the inclined portion 32 of the machine with upper and lower gripping chains 33 and 34 which are constructed identically like the pulling chains 100 and 101 hereinbefore described, but, in this instance, the chains are arranged one above the other so as to grip the ends of the stalks nearest the roots and while carrying them up to a point from which they may be delivered to the binding mechanism to prevent them from being pulled out longitudinally by the action of the seed removing mechanism. This seed removing mechanism may be of any desired character and preferably comprises an upper roll 50 and a lower roll 51 disposed in an inclined position with respect to the line of travel of the flax, so that the tips of the stalks will first enter between these rolls, which are rigidly rotated in the directions indicated by the arrows so as to operate first on the tips of the stalks and gradually operate on the portions near to the rolls as the stalks are carried upward by the gripping chains. The rolls 50 and 51 will be so constructed as to comb the branches of the stalks and remove the seed therefrom. For this purpose we may use rolls covered with card clothing or similar material, or any other material which will remove the seeds from the stalks. We prefer, however, to use the form of cylinder shown in Figs. 14 to 16 inclusive, in which each of said cylinders comprises a series of notched bars 60 rigidly mounted therein and having the projecting portions constructed with their forward faces 61 inclined forwardly and outwardly as shown, the outer edges of said projecting portions being provided with V shaped notches which receive the slender tips or branches of the plant and not only remove the seed pods but tear away the buttons or cups at the ends of the branches and at the same time comb the stalks and branches so as to bring them in parallel relation. The forwardly inclined faces 61 of the bars 60 tend to prevent the flax from flying off and the knife bars of one cylinder are staggered with respect to those of the other cylinder, and the outer edges of the knife bars are flat between adjacent notches so that the progress of the flax from one end of the cleaning mechanism to the other is not impeded. In the rear of each of the knife bars 60 is provided a cleaning bar 62 which carries at each end a roller 63 engaging cam grooves in stationary parts at each end of the housings for the rollers and this cam and roller construction causes the cleaner bars to be projected and withdrawn during the revolution of the rollers, the projection of the bars occurring when they are most remote from the bars of the opposing roller and serving to remove any stalks or branches that may have a tendency to remain in the notches of the knife bar, so as to keep these notches free. The specific construction of this cleaning mechanism will not be herein claimed as it forms the subject matter of another application. After the flax has been passed through the cleaning mechanism as before described it is discharged from the gripping chains 33 and 34 and delivered to the binding mechanism, preferably where it is bound into bundles and discharged from the machine, or it may be delivered directly to the ground without the interposition of the binding mechanism, if desired. The seeds, together with any adhering particles of the plant are received in a trough 70 and the inclined portion 32 of the machine frame is provided with an inclined plate 32$^b$ which conducts the seed, etc., falling thereon to the trough 70. The trough 70 is conveniently provided with a worm 71 for conducting the material to the rear end thereof where it enters an elevator 72 which conducts it upwardly to a discharge hood 73 from which it is discharged into a box, or other receptacle or receptacles. The seed may be dried out and threshed or winnowed to remove the linseed for any purpose for which it may be desired, while the stalks are in suitable condition for treatment for the obtaining of fiber for linen.

In connection with the pulling mechanism we have shown in Figs. 1, 2 and 3 a reel 80 for assisting the grain to enter between the opposing plates of the several pulling units and a supplementary reel 81 for facilitating the discharge of the stalks on to the horizontal carrier 31, and we have also shown the beater 82 located below the forward portions of the various pulling units for knocking the dirt off the roots of the plant, the parts being connected by sprocket gearing or other suitable gearing with the driving mechanism of the machine. We have also indicated mechanism for driving the cleaning rolls 50 and 51 from the bull wheel, as shown in Fig. 1 and the parts may be so driven, or may be driven in any other desired manner.

The pulling mechanism herein shown and described is not specifically claimed herein, as the same forms the subject matter of a separate application, a division of the present application, filed by us October 21, 1914, Serial No. 867,723.

What we claim and desire to secure by Letters Patent is:—

1. In a flax harvesting machine, the combination with a portable supporting frame, of a plurality of pulling units arranged side by side, each of said pulling units comprising a pair of endless carriers having parallel vertically disposed opposed portions inclined upwardly from front to rear thereof, each of said carriers being provided with projecting ribs extending transversely of the growing stalks and alternating with and intermeshing with the projecting ribs of the opposing carrier, mechanism for combing the stalks to remove the seed pods therefrom and prepare them for treatment to obtain the fiber therefrom, and mechanism for taking the pulled stalks from the pulling units and passing them through the seed removing mechanism while maintaining the stalks in parallel relation.

2. In a flax harvesting machine, the combination with a portable supporting frame, of a plurality of pulling units arranged side by side, each of said units comprising a pair of endless carriers having parallel vertically disposed opposed portions inclined upwardly from front to rear thereof, each of said carriers being provided with projecting ribs extending transversely of the growing stalks and alternating with the ribs of the opposing carrier, mechanism for combing the stalks to remove the seed pods from the pulled stalks and prepare them for further treatment to obtain the fiber therefrom, a binding mechanism, and mechanism for taking the pulled stalks from the several pulling units and passing them through the seed removing mechanism, and delivering them to the binding mechanism while maintaining them in substantially parallel relation.

3. In a flax harvesting machine, the combination with means for separating the stalks from the ground, mechanism for combing the stalks to remove the seed pods and prepare the stalks for treatment to obtain the fiber therefrom, and conveying mechanism constructed to receive the stalks and pass them through said seed removing mechanism, while maintaining them in substantially parallel relation.

4. In a flax harvesting machine, the combination with means for separating the stalks from the ground, mechanism for combing the stalks to remove the seed pods and prepare the stalks for treatment to obtain the fiber therefrom, conveying mechanism constructed to receive the stalks and pass them through said seed removing mechanism, while maintaining the stalks in substantially parallel relation, and binding mechanism for binding the cleaned stalks.

5. In a flax harvesting machine, the combination with means for separating the stalks from the ground, mechanism for combing the stalks to remove the seed pods and prepare the stalks for treatment to obtain the fiber therefrom, conveying mechanism constructed to receive the stalks in substantially parallel relation, and pass them through said seed removing mechanism, while maintaining them in substantially parallel relation, binding mechanism for binding the cleaned stalks, and independent mechanism for collecting and separately delivering the seed.

6. In a flax harvesting machine, the combination with a portable supporting frame, of pulling mechanism for separating the growing flax from the ground, conveying mechanism for receiving the flax stalks in parallel relation, and comprising opposed endless conveyers each provided with longitudinally disposed ribs adapted to mesh with the ribs of the other conveyer, for engaging the stalks near the root ends and hold them in substantially parallel relation, while moving them sidewise, and combing devices constructed to comb the stalks in a direction from the root ends toward the heads, while the root ends are held in the said conveying mechanism, to remove the seed, seed pods, and cups, and prepare the stalks for further treatment for the production of fiber therefrom.

7. In a flax harvesting machine, the combination with a portable supporting frame, of pulling mechanism for separating the growing flax from the ground, conveying mechanism for receiving the flax stalks in parallel relation, and comprising opposed endless conveyers each provided with longitudinally disposed ribs adapted to mesh with the ribs of the other conveyer, for engaging the stalks near the root ends and hold them in substantially parallel relation, while moving them sidewise, and combing devices constructed to comb the stalks in a direction from the root ends toward the heads, while the root ends are held in the said conveying mechanism, to remove the seed, seed pods, and cups, and prepare the stalks for further treatment for the production of fiber therefrom, and binding mechanism located adjacent to the delivery end of said conveying mechanism for binding the cleaned stalks.

In testimony whereof, we affix our signatures, in the presence of two witnesses.

NELSON E. FUNK.
LOUIS P. WHITAKER.

Witnesses:
E. W. WYATT,
BERTHA B. APPEL.